Slayton & Kane.
Circular Weaving.

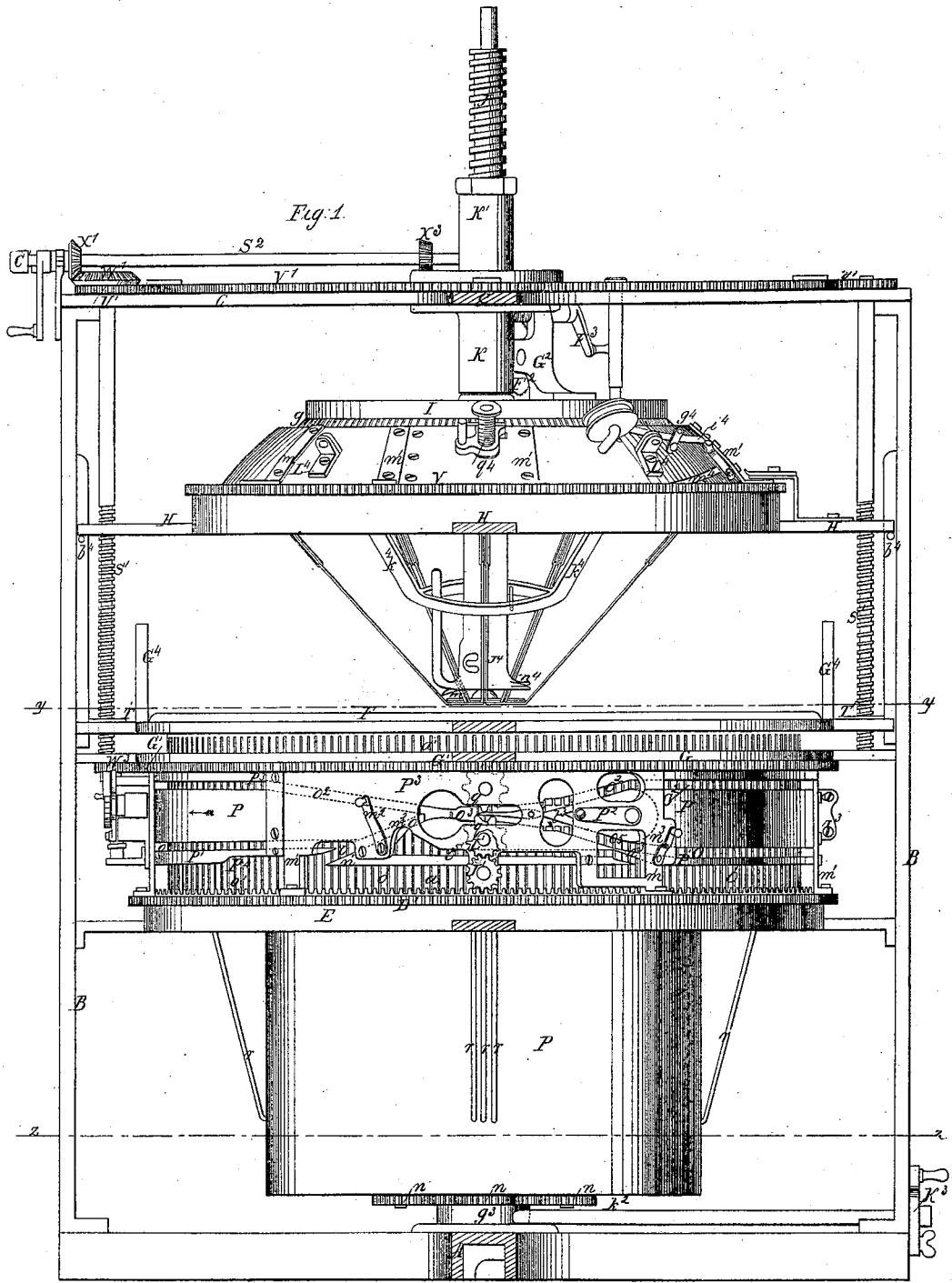

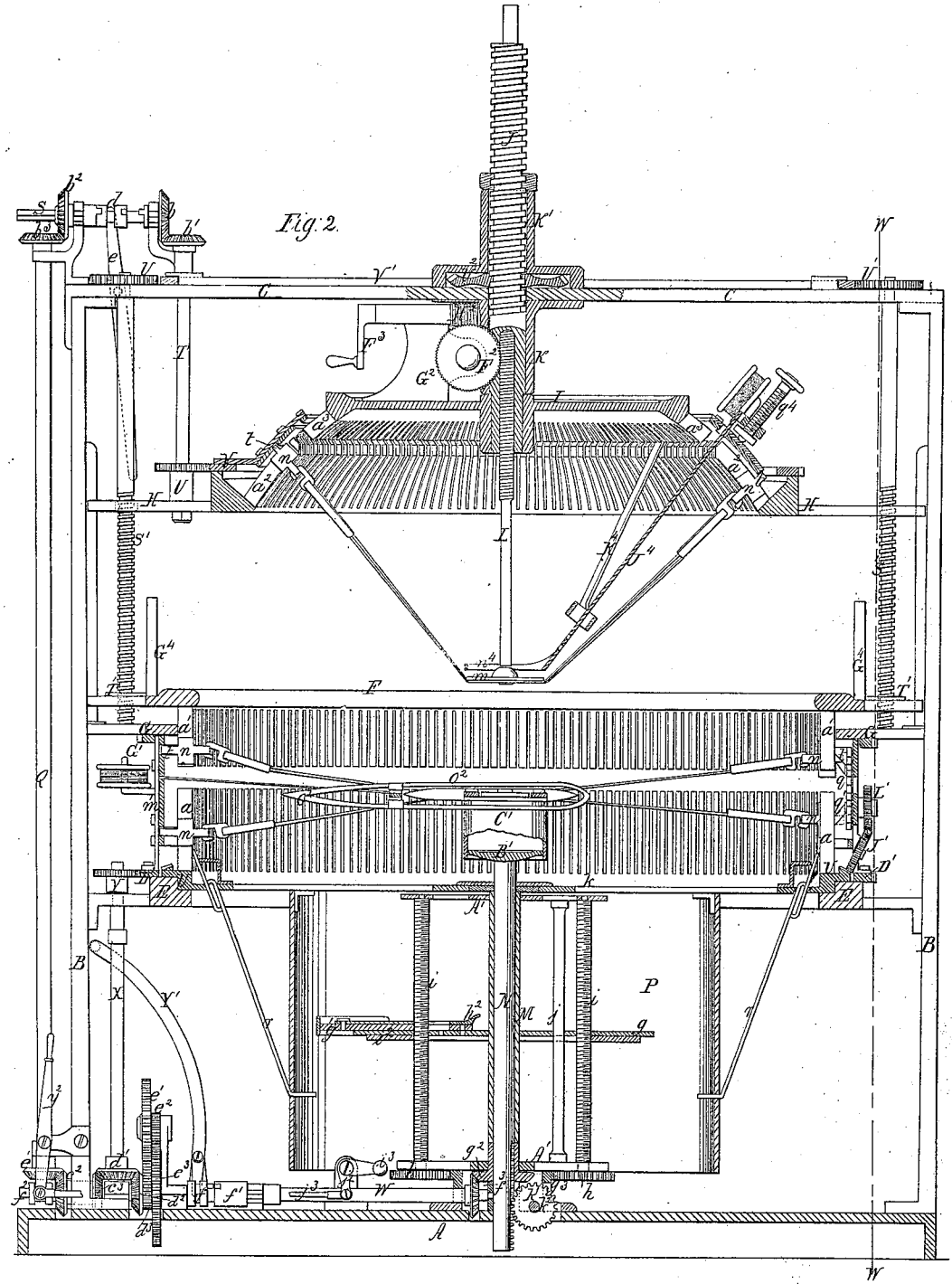

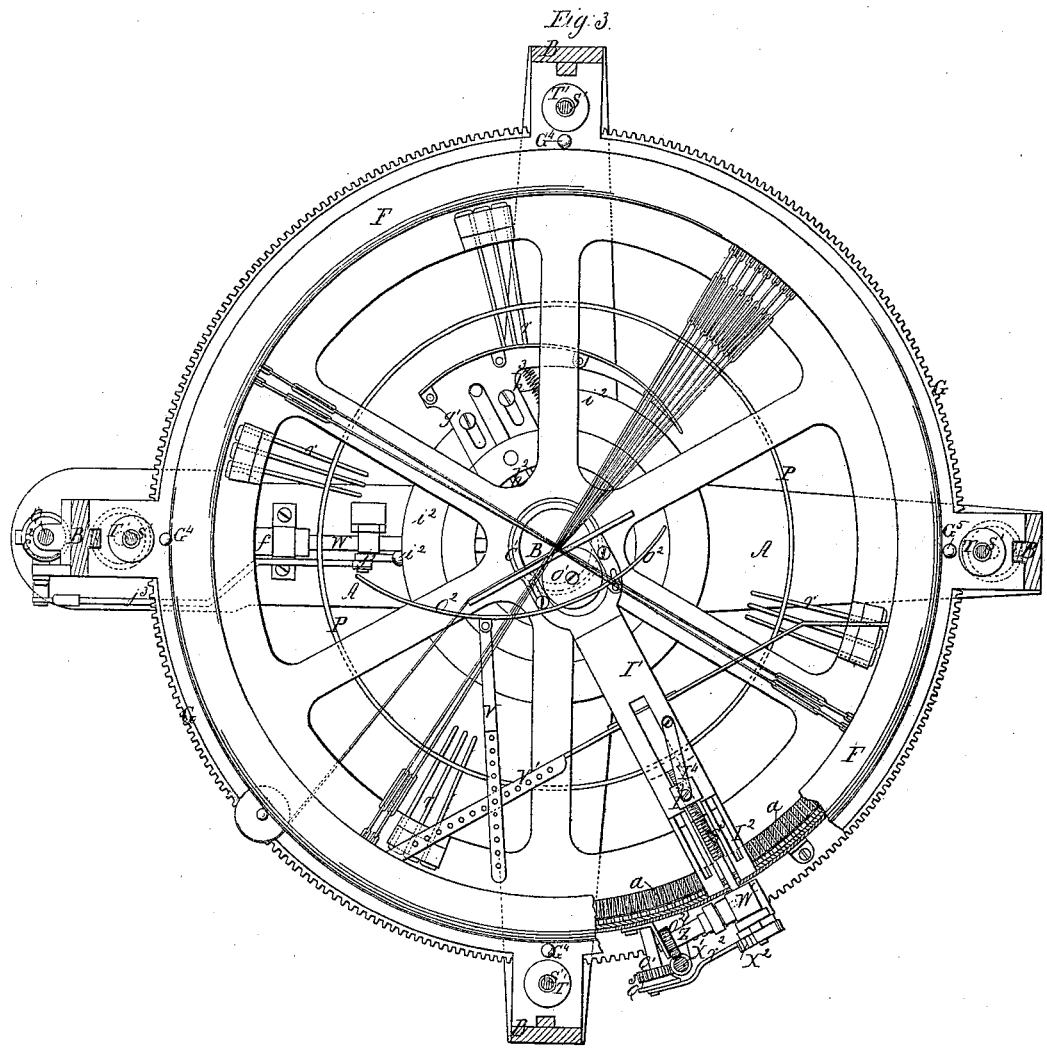

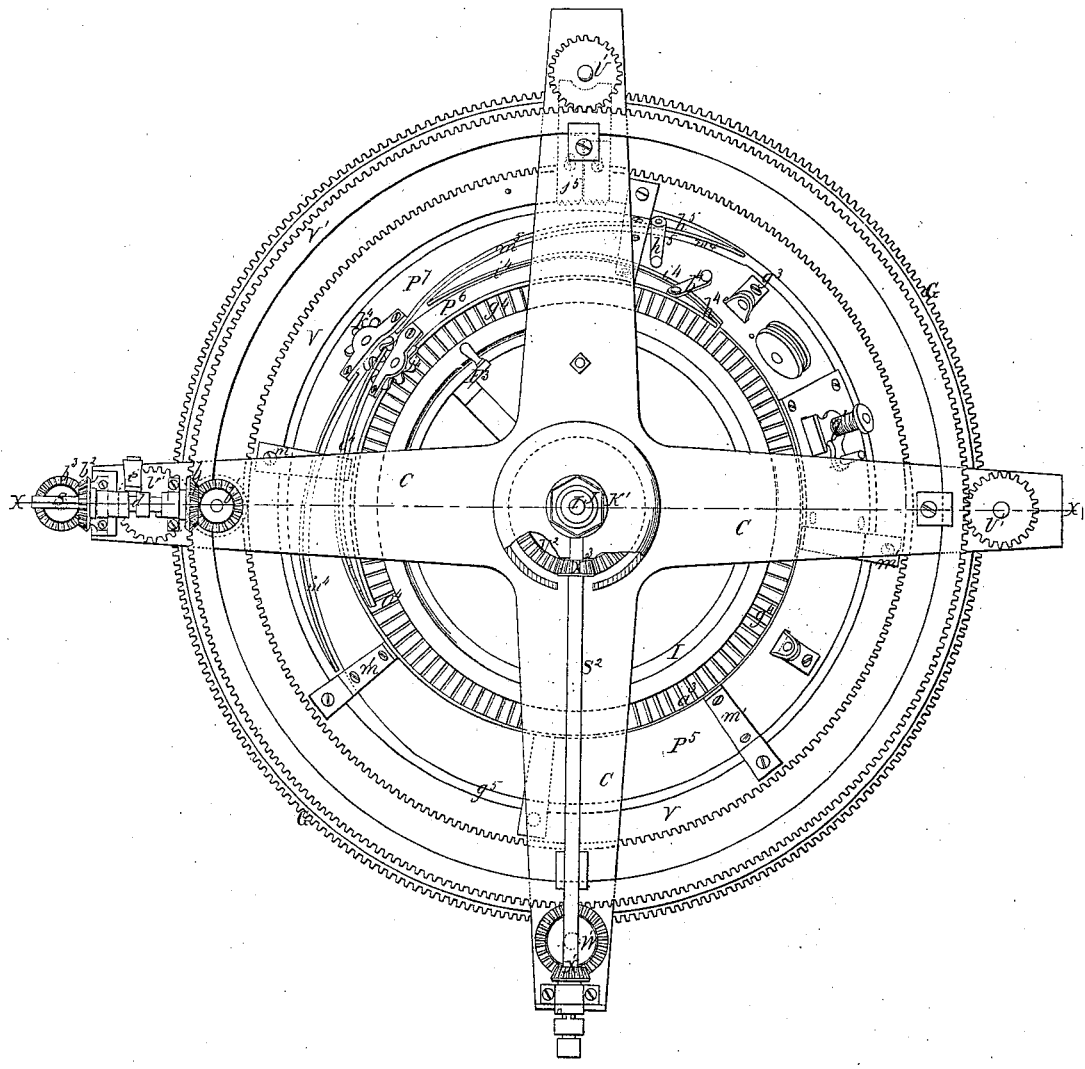

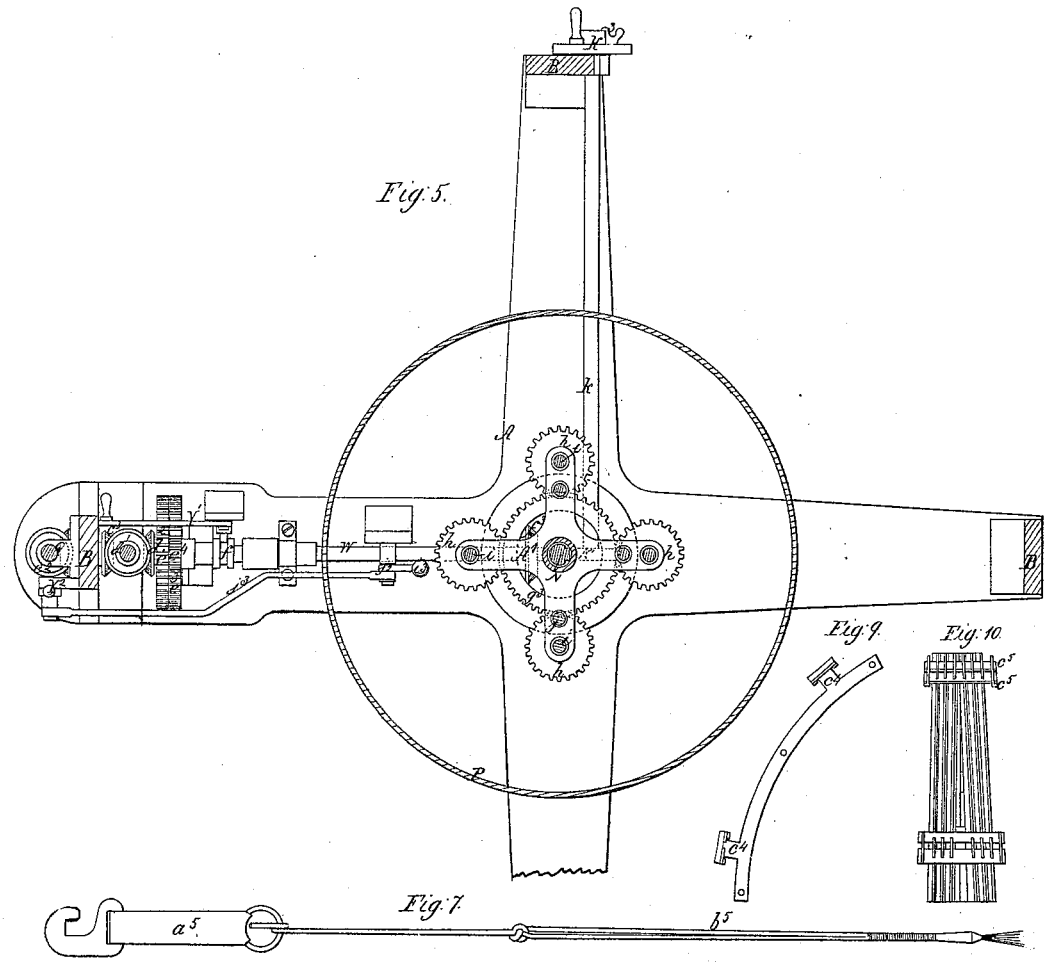

Sheet 6-6 Sheets.

N°59,138. Patented Oct. 23, 1866.

Witnesses;

Inventor;

UNITED STATES PATENT OFFICE.

PHINEAS LEESON SLAYTON AND CHARLES I. KANE, OF NEW YORK, N. Y., ASSIGNORS TO ALMET REED, OF NEW YORK CITY.

IMPROVEMENT IN CIRCULAR LOOMS FOR WEAVING HATS.

Specification forming part of Letters Patent No. 59,138, dated October 23, 1866.

*To all whom it may concern:*

Be it known that we, PHINEAS LEESON SLAYTON and CHARLES I. KANE, of the city, county, and State of New York, have invented a new and useful Improvement in Circular Looms; and we do hereby declare that the following is a full, clear, and exact description thereof, which will enable others skilled in the art to make and use the same, reference being had to the accompanying drawings, forming part of this specification, in which—

Figure 12:
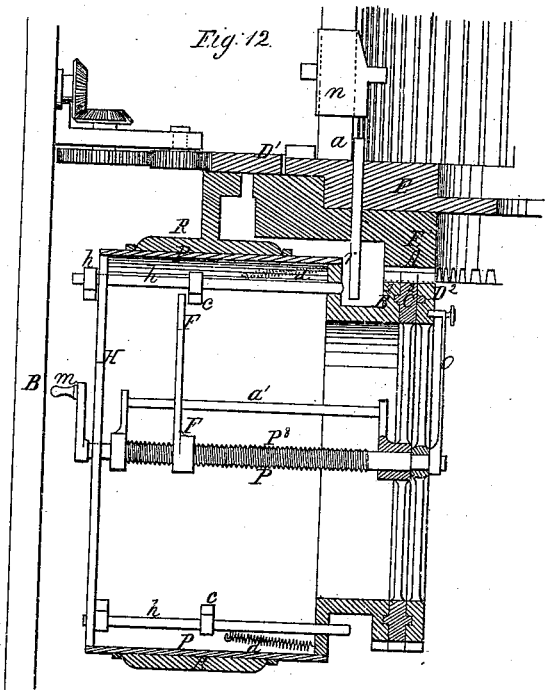
Figure 11:
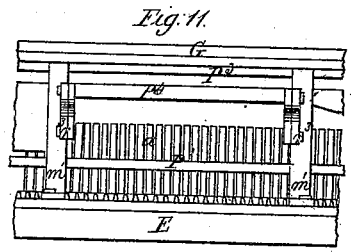

Figure 1, Plate 1, is an elevation of a machine made according to our invention, a portion being seen in section on the line $w$ of Fig. 2. Fig. 2, Plate 2, is an axial section on the line $x$ of Fig. 4. Fig. 3, Plate 3, is a horizontal section in the plane of line $y$, Fig. 1. Fig. 4, Plate 4, is a top view. Fig. 5, Plate 5, is a horizontal section in the plane of line 2, Fig. 1. Fig. 6 is a detailed view of a portion of the lower shuttle-carriage. Figs. 7 and 8 are views of one of the hooks of the warp-carriers, one of them showing its loop extended and the other showing it hooked up. Fig. 9 is an edge view, and Fig. 10 is a front view, of a section of the bridge by means of which the warp-carriers are taken from one shuttle-carriage to the other. Fig. 11 is a view of the gateway made through the middle band, P, of the lower shuttle-carriage to allow the warp-carriers to be moved up to the bridge when about to be transferred to the upper part of the loom. Fig. 12 represents a modification of the indicator, or apparatus for pushing up the warp-carriers into the shuttle-carriage.

Similar letters of reference indicate like parts.

This invention is an improvement in the loom described in Letters Patent granted to Phineas Leeson Slayton, February 2, 1864, and November 2, 1864, where two distinct sets of weaving mechanism are employed, whereof one weaves the crown and brim of a hat, and the other the cylindrical side crown, the two sets being so arranged in the same frame that the warp-carriers can be transferred from one set to the other at pleasure during the progress of the work, for the purpose of weaving the different parts of a hat in due order.

In this improvement, among other novel features, the upper series of partitions, which receive the warp-carriers in their interspaces, are lowered and elevated, as occasion requires, within the circumference of the series next below, in order to bring such upper series in proper position to be put in connection with the lower series of partitions by a transferring-bridge, over which the warp-carriers are conveyed from the lower series of partitions to the upper, or, vice versa, the frames of the intermediate series being also made movable, to enable the operator to put them out of the way of the transferring-bridge. The separating-wheels of the lower shuttle-carriage are rotated constantly by positive motion derived from the revolution of said carriage. While the warp-carriers, or any of them, are out of action, they are collected in a circumferential space or channel formed below the lower shuttle-carriage, out of which they are successively raised by certain mechanism under automatic action, hereinafter set forth, which brings them up in pairs to such a height as to come above the level of and be engaged by a projection on the lower band of the said shuttle-carriage, and to be thereby guided into the grooves or channels of the carriage, which are so arranged as to form a shed in the warp during the continued rotation of the carriage by bringing the warp-carriers alternately and successively into said grooves or channels of different heights.

The mechanism which operates to raise the warp-carriers out of the lower or primary channel consists of an indicator and its attachments, placed, in this example, in the lower part of the loom, and revolving with the shuttle-carriage. Its office is to lift up the warp-carriers out of the primary channel, so as to supply additional strands of warp as fast as they are needed, without requiring the labor or care of the attendant.

When the crown of a hat has been woven, and it is necessary to raise the warp to the upper set of weaving mechanism in order to form the side crown, the warp-carriers are transferred by means of a bridge interposed between the lower and higher series of the partitions whose interspaces hold such carriers, the intermediate series of partitions being moved out of the way for the time being. When the side crown has been completed the bridge is again placed in the machine in order to retransfer the warp-carriers to the action of the lower shuttle-carriage, by means of which the brim is then woven.

The mechanism rests on a bed-plate, A, from which rise four standards, B, that are connected at top by the top plate C, which is partly cut away between the several standards, so as to leave the mechanism below it accessible.

E is a stationary ring that supports the lower shuttle and its attachments, and also the partition between which the warp-carriers are moved up and down. The said ring is supported by brackets from the standards B. The partitions between which the warp-carriers move are arranged vertically and in circular order about the axis of the machine as a center, and they consist of two series for the upper shuttle and two for the lower shuttle. Said shuttles encircle the partitions and are moved about them as hereinafter set forth. Those for the lower shuttle are designated by the letters $a$ and $a^1$, the former rising from the upper surface of ring E, and the latter extending downward in the same circular line from a ring, F, supported, like ring E, from the standards B, and arranged so as to be adjustable as to its height in the machine.

The ends of the two series of partitions are separated by a space, through which the weft passes toward the center of the loom. The number of partitions in each division and series is equal to the greatest number of threads or strands to be used in the warp, and are equidistant, and are also in the same vertical line, so that when the upper and lower series are connected by a bridge, as hereinafter explained, the warp-carriers $n$ can pass from the lower series to the higher, and vice versa.

The interspaces or narrow intervals between adjacent partitions receive the warp-carriers, which consist of small pieces of metal bent or formed, so that they are confined between but are free to be moved vertically between adjacent partitions, such warp-carriers having lugs on both their outer and inner edges.

The lugs on their outer edges extend outward beyond the outer faces of the partitions, so as to become engaged by the shuttle-carriages, whose grooves or channels they enter, as seen in Fig. 2, in both the upper and lower weaving mechanism, the revolution of the shuttles consequently causing them to be raised or lowered, according to the inclination of the grooves or channels. The inner lugs of the warp-carriers have loops formed on them, which are engaged by hooks that carry the strands of the warp, one of which is shown in two views in Figs. 7 and 8. The strands extend from the hook of one carrier, $n$, across the center of the loom to the hook of the opposite carrier, the attachment of the strands to the hooks being made by means of cords, which can be shortened and lengthened at pleasure, as hereinafter mentioned, springs being interposed between the hooks and the place where the strands are attached, in order to hold the warp sufficiently tight or with sufficient tension for weaving, and to allow the ends to yield sufficiently to compensate for the length taken up as the weaving progresses, and to compensate for the displacement of the warp by the blade as it revolves through the shed and deposits the filling.

The opening of the strands to form the shed is effected by moving the warp-carriages, through the agency of the channels in the shuttle-carriages, from the upper to the lower partitions of either set, and vice versa, the order of operation depending on the kind of weaving, plain or twilled, to be produced, but for plain weaving one warp-carrier is elevated and the next depressed, and so on, for all that are engaged, those which are depressed—that is to say, which are in the lower division of partitions during one revolution of the shuttle—requiring to be elevated to the upper division in the next; and, therefore, it follows that an odd number of carriers is required.

The shuttle carriages are in this example arranged for plain weaving. They consist, both for the upper weaving mechanism and for the lower, of rings or bands that surround the partitions $a a^1$, &c. Portions of both shuttle-carriages are seen in Fig. 1, and a part of the lower one is seen also in Fig. 6, while the whole of the upper one is seen in Fig. 4.

The upper part of the lower shuttle-carriage is guided by a stationary ring, G, that is connected to the standards by arms or brackets.

The upper weaving-partitions are supported by a ring, H, which has arms that extend to the standards B and embrace vertical ways $b^4$, along which they are guided, so that the ring H is free to rise upward from the position given to it in Fig. 1, where the ends of its arms are shown resting in blocks fixed to the ways $b^4$. I designates an adjustable circular plate that holds the partitions $a^3$. J is an adjustable sleeve, whose lower end is attached permanently to plate I, and rises and falls with it. K K' are angular sleeves for guiding the sleeve J, one of them being fixed above and the other beneath the top plate C.

The letter L, Fig. 2, designates a central plunger, which is adjustable independently of sleeve J, although it is placed within it and has the motions belonging to it. The lower end of plunger L carries a horizontal follower consisting of a disk, $m$, of a circumference equal to the circumference intended for the crown of the hat being woven, and which disk is connected to it by a ball-and-socket joint, so as to be capable of yielding in every direction to the work beneath it, on which it is pressed by means hereinafter described.

In the lower part of the machine is a stationary brass sleeve, M, which is supported from its upper end by the central part of a light frame, $k$, that extends inwardly at the level of the ring E. Within it is a plunger that can be elevated and depressed at pleasure by means of a gear-wheel, $k^1$, that engages teeth cut on one side of the plunger at its lower end, said gear $k^1$ being placed on a radial shaft, $k^2$, (see Fig. 5,) that extends through one of the standards B near its foot, and carries a crank-plate, $k^3$, having a circular slot, through which a clamping-screw passes that enables the operator to clamp the crank-plate, and consequently hold the plunger N stationary at whatever elevation it is placed. The top of the plunger N has on it a circular plate, $B^1$, which carries a frame, $C^1$, that is used when weaving the brim of a hat.

The fixed sleeve M is surrounded by a fixed hollow cylinder, P, which incloses the indicator. Its sides are drilled full of holes to receive the lower ends of the indicator-rods $r$, whose office is to raise the warp-carriers from time to time out of the primary channel $O^1$ below the shuttle. These holes are arranged in a series, which rises gradually higher toward the top of cylinder P, the rods being shortened in due proportion.

The lower ends of rods $r$ project through the sides of cylinder P far enough to come in contact with the indicator-cams $g\ g^1$ when the latter are brought opposite to the lower ends of the rods. The said cams are shown in Fig. 2 above and out of engagement with the rods. They are brought opposite thereto by means of vertical screws $i$, which are rotated by devices hereinafter described, so as to gradually elevate the cams while they rotate with the shuttles.

The power for driving the two shuttle-carriages is received on horizontal shaft S, and by means of miter-wheels $b\ b^1$ motion is given to vertical shaft T, whose pinion U engages the teeth cut on the ring V of the upper shuttle-carriage. The shaft S also gives motion to the upright driving-shaft Q through the miter-wheels $b^2\ b^3$. (See Fig. 2.) Between the miters $b\ b^2$ is a double clutch, $d$, which is operated by a shifting-lever, $e$, to the right or left, according as motion is to be given to the upper or lower shuttle-carriage. The miters $b\ b^2$ are loose on shaft S, the clutch $d$ being connected with the shaft by means of a feather. Upon the lower end of shaft Q is a miter-wheel, $c^1$, that gives motion to the miter-wheels $c^2$ and $c^3$, which are united into one by a tube-collar that passes through the standard B, and is fitted loosely to the horizontal shaft W. The miter-wheel $c^3$ gives motion to the miter-wheel $d^1$ on the upright shaft X, and also to the miter-wheel $d^2$, which likewise runs loosely on shaft W. The upper end of shaft X carries a pinion, Y, that engages with the teeth of the ring D of the lower shuttle-carriage, and so drives that shuttle.

A pinion, $d^3$, formed on the hub of miter-wheel $d^2$ drives the spur-wheel $e^1$, which runs loosely on a stud and carries on its face a pinion, $e^2$, that drives a spur-wheel, $e^3$, which is fixed on a sleeve that revolves loosely on shaft W and carries a clutch, $f$, which is moved longitudinally on the sleeve by a lever, $Y^1$. When the clutch $f$ is moved toward the right so as to engage a clutch, $f^1$, fast on the shaft W, the shaft is rotated in the direction of motion of spur-wheel $e^3$; but when these clutches are unlocked, and the clutch $f^2$ on the outer end of shaft W is locked upon the inner or smaller face of the miter-wheel $c^2$, by moving the lever $Y^2$ the shaft W is turned in the contrary direction.

By means of these devices the cam-plates $g$ $g$, when they are below the rods $r$, are raised slowly to the proper height, and at the same time are made to revolve with the shuttle-carriage, both making a revolution in the same time, the speed being reduced by means of the gearing $e^1\ e^2$ before motion is communicated to clutch $f^1$ on shaft W. When, however, it is desired to lower the cam-plates $g\ g^1$, and to move the shaft in reverse direction by means of miter-wheel $c^2$, the speed is fifteen times greater.

The inner end of shaft W carries a miter-wheel, $f^3$, which gives motion to a wheel, $g^3$, attached permanently to the revolving frame $A^1$. This frame is composed of two plates united to each other by standards $j$.

The upper plate is just below the central arms of ring E. They are fitted around sleeve M, and are united together to form one frame by means of rods or standards $j$. Attached to the under side of the arms of the lower plate of this frame are gear-wheels $h\ h\ h\ h$, that receive motion from a stationary ring-wheel, $g^3$. From each of these wheels $h$ rises a screw, $i$, whose upper ends turn in the arms of the upper plate of frame $A'$. These screws are operated in unison when the frame $A'$ is revolved, and they give motion to the two cam-plates $g\ g$, being tapped through the lower cam-plate, $g$, which acts as a nut on the screws. By this means the cam-plates are raised or lowered according to the direction of rotation of the screws.

The upper plate, $g^1$, rests on one end of plate $g$, and has provision for a lateral motion. Its outer end carries an arc curved eccentrically with respect to the sleeve M, which is encircled by the lower plate, $g$, and the circumference of the arc is widened, as shown in sectional view, Fig. 2, so as to have a broad perpendicular surface to act with certainty on the lower ends of the indicator-rods $r$. When plate $g^1$ is in a working position it is drawn outward to within a short distance, say, about one-eighth of an inch, of the inside surface of the brass cylinder P, and is caught in that position by a small projection upon the under side of the inner end of a flat spring, $h^3$, which passes through plate $g$ and catches into a mortise or slot in the plate $g$ underneath. This spring is secured by one end to the upper surface of plate $g^1$ near its rim, extending thence toward the inner end of the plate, inclosing one of the screws $i$ on its way within a slot made in said spring of sufficient length and breadth to allow of the movement of the cam-plate without interference between the screw and the spring.

The cam-plate $g^1$ has a like slot where it passes around the same screw. The set-screws or pins which attach the cam-plate $g^1$ to the plate $g$ below, pass through slots in said plate $g^1$, which are lengthened so as to allow the plate $g$ to be moved radially on plate $g$. The said plate $g$ is drawn toward the center of the cylinder P by a spiral spring, $h^3$, (see Fig. 3,) one of whose ends is attached to each plate, whenever the flat spring $h^2$ is raised out of engagement with the lower plate, at which time the frame A' is run backward and descends to its lower position.

To the under side of plate $g$ is attached a light ring, $i^2$, and as the plates come sufficiently low the ring comes in contact with an anti-friction roller on the end of a small elbow-lever, $i^3$, secured to a bracket by a pin, $j^2$, and forces that end down, thereby moving the horizontal rod $j^3$ outward, to whose inner end the lower arm of the elbow-lever is attached. The outer end of this rod is attached to the lower end of the lever $Y^2$ that moves the clutch $f^2$ into and out of engagement with the teeth cut on the small end of miter-wheel $c^2$. Consequently when rod $j^2$ is moved outward the bottom of the lever is moved outward, and the clutch is disengaged from wheel $c^2$.

The hat-forming frame $C^1$ consists in this example of a short hollow cylinder that is supported by the circular plate $B^1$ on the top of plunger N. The frame is merely set on the plate, and is kept in position by suitable pins, that lock them to each other. After the crown and side crown of a hat are woven the plunger is elevated, and the top of the frame is brought up to the weaving-line, and incloses so much of the work as is woven, and forms a substantial rigid edge or rim, over which the entire strands are bent for the weaving of the brim of the hat. In the mean time the circular crown-plate $m$, which is secured by a ball-and-socket joint to the lower end of a plunger, L, is lowered far enough to press tightly down to the inside surface or bottom of the crown, as much below the weaving-line as the depth of the side-crown, thereby causing the unwoven parts of the warp to be strained firm and taut, and in proper condition for weaving the brim.

In order to operate the indicator apparatus and the lower parts of the loom the lever $Y^1$ is lowered, so as to throw forward the clutch $f$ to connect it with the clutch $f^1$, and at the same time the lever $Y^2$ is pushed back to disconnect the clutch $f^2$. The cam-plate $g^1$ is next set in its outward position, and power is applied through the shaft Q, when the indicator-frame $A^1$ will commence moving in the direction of the lower shuttle-carriage, keeping time with it, and gradually rising, according to the pitch of the screws $i$, so as to bring the cam $g^1$ against the ends of rods $r$, forcing them back nearly to the inner surface of cylinder P, and thereby lifting the warp carriers or blocks $n$, that are in the primary channel, a short distance, until they are caught up by the revolving shuttle, and thus fed into the work at the proper time and place. When the cam-plates are lifted high enough to have acted on all the rods the motion of the screws $i$ is reversed by changing the two levers, $Y^1 Y^2$, and the plates $g g^1$ run down rapidly toward their lowest position, the ring $i^2$ coming in contact with the friction-roller on the upper end of elbow-lever $i^3$, and, by pushing that end down, causing the clutch $f^2$ to be detached, when the motion ceases. The remainder of the hat is finished without the indicator-cams.

The ring $D^1$ is the foundation of the lower shuttle-carriage. From the upper face of this ring rise several upright standards, $m^1$, at proper intervals, to which are secured several bands that run around the outside of the partitions $a$ $a'$, such bands being separated one from the other, and also constructed in such a way as to form small channels or passages that receive the outer lugs of the warp-carriers. These bands and their attachments form the lower shuttle-carriage. Such shuttle-carriage carries on its inside face a blade, I, (see Fig. 2,) hereinafter described, and on its outer face the separating-wheels $q$ $q^1$, for separating the warp-carriers and directing them in regular alternation to the upper and lower channels of the shuttle-carriage. These wheels are seen in Fig. 2 in edge view, and in Fig. 1 in dotted outline.

There are two shuttle-carriages; one for the lower set of weaving mechanism and one for the upper. The lower shuttle-carriage is composed of three bands, P $P^1$ $P^3$, which encircle the partitions $a$ $a^1$, in whose interspaces the warp-carriers are held. The middle band, P, is wider than the others, and, except at the junction of channels $O^1$ $O^2$, and at the place of gate $P^4$, hereinafter mentioned, incloses or surrounds the interval left between the two series of partitions, $a$ $a^1$. All three of these bands are fixed to the ring $D^1$, and, consequently, their positions relatively to the lower series of partitions, $a$, are never changed while the machine is in operation. Those edges of the bands, which are adjacent to each other, are so made as to form a lower channel, O, and an upper channel, $O^2$, which channels are brought together in front of the separating-wheels $q$ $q^1$, to produce a short channel, $O^3$, at about the middle of band P.

The band P is not continuous about the partitions $a$ $a^1$, but is interrupted at the place of channel $O^3$, in order to allow the upper and lower channels O $O^2$ to effect a junction there to enable the warp-carriers which have completed the circuit of channel O to pass up into channel $O^2$, and those which have completed the circuit of the channel $O^2$ to pass into channel O, thereby crossing each other's path and forming a new shed.

The end of the band P on the right of channel $O^3$ is very narrow, and recommences the channels O $O^2$ by being extended between the bands $P^1$ $P^3$. The separating-wheels $q$ $q^1$ are placed across the said channels O $O^2$, so as to command their entrances, one above and the other below the end of the band P, the teeth of the wheels being allowed to engage with each other by cutting away a portion of the band or diminishing its thickness. The band P to the right of the separating-wheels has a switch, $t^3$, that is operated by a lever, $P^2$, such switch serving to close channel $O^2$ and allow all the warp-carriers that pass the separating-wheels to descend into channel O. This switch can also be placed in a horizontal line, as seen in Fig. 1, and can be turned down to close channel O, and thereby compel all the warp-carriers to travel upward into channel $O^2$.

Band $P^1$ forms the bottom of the lower shuttle-carriage, and is placed at a little distance below band P, so as to form channel O between them. This lower band, P, is provided with two switches, $m^2$ and $n^3$, placed, respectively, at or near the inclinations of channel O, on the right and left of the separating-wheels, both switches serving to put a short supplementary channel, $O^5$, that is made in the lower part of band P, into communication with the horizontal portion of channel O. Each switch has its proper handle $m^2$ $n^3$, by which it is operated. The channel $O^5$ may be bent downward beneath the separating-wheel $q^1$, to clear it in case the position of said wheel is so low as to prevent the lugs of the warp-carriers from passing it when the channel $O^5$ pursues a horizontal course. When switch $m^2$ is in the position seen in Fig. 1 the left-hand end of channel $O^5$ is shut, and the course of the warp-carriers will be up the inclined part of channel O; but when it is down they will fall into channel $O^5$, and be conducted into the primary channel $O^1$, when switch $n^3$ is turned up or into channel O, when that switch is turned down into the rabbet made in the lower part of band $P^1$. Switch $n^3$ can, like switch $t^3$, be placed in three positions, the middle one of which it occupies in Fig. 1. When it is turned upward to its highest position it closes channel O and allows the warp-carriers as they pass the separating-wheels to descend into the primary channel $O^1$. This channel is below the lower band, and holds the warp-carriers which are for the time being not employed in the work. The warp-carriers are admitted to it through channel $O^4$ when the switch $n^3$ is turned upward, and they are taken out of it by means of tongue $n^1$, where there is a break in the lower band, $P^1$. This band is narrowed to the left of the tongue $n^1$, so as to permit the warp-carriers, after the shoulder $P^4$ has passed them, to be raised by the indicator-rods to a height where they will be engaged by the tongue.

The standards $m^1$, which hold the bands P $P^1$ $P^3$, near the place of the separating-wheels are combined into a plate which partly covers the bands and furnishes bearings for the journals of the switches and of the wheels $q$ $q^1$ $J^1$ $L^1$. A spool that holds the filling-material is fixed to the outside of band P, the filling going thence toward the center of the loom through an opening in the band.

The upper shuttle-carriage is made on the same general principle as the lower one—that is to say, with channels and switches and separating-wheels. The main band thereof, $P^5$, is interrupted at the place of the separating-wheels $J^4$ $K^4$, its ends being narrowed gradually, one of its termini projecting partly past the separating-wheels.

A channel, $g^4$, for the reception of the warp-carriers, in the upper set of partitions, $a^3$, is provided above the band $P^5$, and a like channel, $g^5$, is provided below it. Two other channels are formed in connection with the upper shuttle-carriage, namely: channel $m^4$, which leaves channel $g^5$ at the place of the switch $h^5$ and leads to the separating-wheels, and goes thence behind them back again to channel $g^5$; and channel $i^4$, which leaves the upper channel, $g^4$, at the place of switch $h^4$, and, leading to the separating-wheels, goes thence back to channel $g^4$. These channels are formed, in conjunction with band $P^5$, by the sectional bands $P^6$ $P^7$, switches $h^4$ $h^5$, having proper handles $h^4$ $h^5$, being made at their forward ends, (see Fig. 4,) so that the channels $i^4$ $m^4$ can be closed at pleasure. The upper shuttle-carriage has also its spool of filling, like the lower carriage.

The motion of the lower shuttle-carriage is taken from the spur-wheel Y of upright shaft X, which wheel engages with the teeth on large ring D'. The light ring G is stationary, and forms a guide for the upper part of the lower shuttle-carriage. Below ring G, and attached to it, (see Fig. 2,) is a light ring, $G^1$, whose outer edge has spur-gear teeth that engage a pinion, $W^3$, formed on the upper end of a worm, $X^1$. (See Fig. 6.) Through the ring $G^1$ the motion for weaving the crown and brim of a hat of an oval shape is derived, as hereinafter explained.

Before explaining the devices for weaving in an oval form, we will describe the operation of the separating-wheels $q$ $q^1$.

The shuttle-carriage continually revolves toward the left, as shown by the arrow, and the passages O $O^1$, &c., formed by the bands P $P^1$, &c., are intended to receive the outside lugs or stems $t$ of the warp-carriers, by which the motions of the warp-carriers are controlled. The blocks or warp-carriers $n$, at the commencement of weaving, are below the path of the shuttle—that is to say, in the primary channel O below band $P^1$. The inside stems of a pair of warp-carriers receive a push from one of the indicator-rods $r$, and are raised high enough to allow the point $n^1$ of the shuttle-carriage to pass beneath them, and so force them along the inclined channel O, along with others thrown up before in the same manner, up to the channel $O^3$. Those blocks or warp-carriers whose stems or lugs are in the upper channel, $O^2$, are brought downward toward channel $O^3$ by the inclination of channel $O^2$, as shown in Fig. 1, and are also collected in said channel $O^3$. The further rotation of the shuttle-carriage causes the separating-wheels $q$ $q^1$ to come into contact with and separate them by passing them alternately into the upper and lower channels, $O^2$ O, behind said wheels, so that the warp-carriers are equally divided between these two channels, those that come down from the upper channel, $O^2$, to the left passing into the lower channel, O, and vice versa, while those which are just raised from the primary channel $O^1$ (two being always raised together) will go one upward and one downward alternately. Those warp-carriers which are thus raised into the channel $O^2$ are retained therein throughout one revolution, when they pass through the wheels $q\ q^1$ again, and are carried into channel O through the next revolution, and so on until the work is done.

The whole number of carriers is an odd number, and therefore it becomes necessary that they should be changed alternately to the upper and lower channels, $O^2$ O, as described. The extreme end of the middle band, P, is narrowed, so that it passes between the wheels $q$ $q^1$, terminating opposite their axes, and serving as a guide to the stems of the warp-carriers to cause them to take an upper and lower course alternately, the rotation of the shuttle-carriage, to which the wheels are attached, causing their teeth to come against the lugs of the warp-carriers, so as to become engaged with them, the lugs falling in the interspaces of their teeth, and being then delivered into the said channels O $O^2$ in alternate order, as above stated.

The wheels are rotated at a uniform speed by means of a circular rack, U, formed on the upper face of ring E, having the same number of teeth as there are partitions $a$, which rack engages a gear-wheel, J, that gears with a like wheel placed on the outer end of the shaft of the toothed wheel $q^1$; consequently the revolutions of the shuttle-carriage and of the separating-wheels are in unison.

At the commencement of each hat it is necessary that the whole number of warp-carriers or blocks $n$ be run down into the lower or primary channel or passage, $O^1$. The switch $t^3$, which is made in the central band, P, near its end at the right of the separating-wheels, is then turned down by means of its handle $P^2$, so as to close the lower channel, O, and leave the upper one, $O^2$, open. One revolution of the shuttle-carriage will now cause all the warp-carriers to be brought into the channel $O^2$. In the next place, the small switch $n^2$ is raised by means of the lever $n^3$, so as to open a short channel, $O^6$, (see Fig. 1,) which forms a communication between the channel $O^3$ and the primary channel $O^1$, through the inclined part of channel O, that lies between the switches $t^3\ n^3$, and said switch $t^3$ is at the same time raised, so as to bring its point above the band P to its highest position, in which it closes the communication between channels $O^2$ $O^3$. When the switches are in this position another revolution will cause all the blocks to pass down into primary channel $O^1$, when they are forced down to their lowest position, out of the way of tongue $n^1$ by the cam $P^4$, formed on the lower band, $P^1$. The switches $t^3\ n^3$ are next restored to the positions shown in Fig. 1. The carriage is now in a state to proceed with the weaving, and as the work goes on each pair of blocks or warp-carriers wanted in the hat are lifted up over the tongue $n^1$ by the proper indicator-rods $r$, as above described, until all that are required are raised from said primary channel, which, at this stage of the weaving, includes two-thirds of the whole number.

The intermediate wheels, $J^1$ $L^1$, which communicate the motion of ring E to the separating-wheels $q\ q^1$, have twice the number of teeth of said wheels $q\ q^1$, each of the latter, as they revolve, engaging every other block or warp-carrier.

The switch $m^2$, at the left of the separating-wheels, is only used when the bridging operation hereinafter described is performed. By it the passage or channel O is put into communication with a channel, $O^5$, below the lower separating-wheel, $q^1$, for the purpose of preventing the warp-carriers from going between the wheels $q\ q^1$ during the continuance of that operation. When the switch $m^2$ is thrown down the switch $n^3$ is also down to its lowest position, thereby making the channels O $O^5$ to form an uninterrupted channel throughout the shuttle-carriage while the bridging operation is performed.

That portion of the machinery called the "blade" is situated forward of the separating-wheels—that is to say, toward the left—at a distance equal to about one-fourth the circumference of the carriage. Its use is to deposit the filling in the shed of the warp and press up the work sufficiently tight. It is made in two parts, $I^1$ $I^2$, one of which, $I^1$, is movable, the part $I^2$ being attached rigidly to the shuttle-band P, at the proper height to pass freely in the space between the ends of the upper and lower partitions, $a'\ a$. The motion to feed the blade is obtained from the ring $G^1$ by a pinion, $W^3$, on the upper end of screw $X^1$, whose rotation operates two separate worm-wheels, $Q^1$ $Q^2$, (see Fig. 3,) each of which performs a separate office.

Upon the outside face of wheel $Q^1$ is a small plate, which holds one end of a lever, $r^2$, whose other end is attached to the lower end of a lever, $f^2$, that is connected by a collar to the hub of a ratchet-wheel, $X^2$, that is fixed on the outer end of the horizontal screw $S^3$. The upper end of lever $f^2$ reaches above the ratchet-wheel, and carries a pawl, that engages said wheel and gives motion to it, and consequently to the screw, whose rotation draws the inner part, $I^1$, of the blade toward the center of the loom by means of the nut $i^2$, which nut is held down on the screw and secured to the part $I^1$ by the spring $i^4$. The other worm-wheel, $Q^2$, contains an even number of teeth, for the purpose of revolving the shaft Z, on which it is fixed, just twice during one revolution of the shuttle-carriage.

The shaft Z is made in two parts, the end toward the blade being a sleeve, on which, at one side of the center, is a small pin, $U^2$, that acts as an eccentric, moving the block $W^1$ in and out at a certain distance; but, there being a slot in the side of the block, in which the pin works up and down freely, only a horizontal motion is given to the block, and said block being placed on the screw $S^3$ outside of the shuttle, it follows that the like motion is imparted to all the parts connected to said screw. During the weaving of the crown this motion is not required. It is only required on the brim. Therefore, when in use, the pin $w^2$ is passed through the shaft and sleeve. When not in use, the pin $w^2$ is removed.

On the front end of the part $I^1$ of the blade is the packing-wheel $O^1$, which forces the filling up tightly in the shed of the warp, and straddling this wheel is a curved piece, $O^2$, called a "divider," which operates to distend the shed of the warp wide open, and allow the wheel to act with force and directness on the filling. Both the wheel and divider are adjustable, and are adjusted as the work progresses, the divider being moved to and from the center of the loom by a small bar, V, which is connected to a supporting-bar, $V^1$, which extends, like a chord of a circle, across the machine, its ends being secured to the inner face of the shuttle-carriage, opposite the space that separates the partitions $a$ $a^1$.

When a hat has been woven and it is required to replace the blade in its first position, the screw S is turned backward by hand by means of a small handle on the face of ratchet-wheel $X^2$.

This description applies thus far only to work that is woven in a circular shape; but a hat to fit properly upon the head should be made oval, especially in the brim. This should be done in the weaving, otherwise the hat would not remain oval. Consequently in weaving the brim it is necessary to weave a little closer on two sides thereof than on the two opposite sides. To effect this the blade is made in two parts, as above shown, to enable it to be shortened and lengthened as required, such shortening and lengthening being done twice during every revolution. The two parts of the blade are first secured together so as to act as one, and the blade is then pushed forward to the bottom of the screw, the divider $O^2$ is brought farther forward, and the packing-wheel is brought as close to the center as required, the filling coming in from a spool on the carriage near the forward end of the divider. The warp having been put in, the carriage is started, and at each revolution the screw $S^3$ lets off the required amount of feed until the crown is woven, when the warp is transferred to the upper part of the loom by the bridging operation hereinafter described, and the weaving is carried on, in connection with the upper shuttle-carriage, until the side crown is woven, when it is again transferred to the lower rings for the purpose of weaving the brim. The forward part of the section $I^1$ of the blade still remains in the same position as when the crown was finished, and continues to operate in the same manner as before, excepting that the motion of the worm-wheel $Q^2$ and of the eccentric connected therewith is added when an oval rim is desired, otherwise it remains off.

The transferring of the warp-carriers from the lower weaving rings to the upper takes place when the crown has been woven. In weaving the crown and side crown, only two-thirds of the warp-carriers are used, the other third still remaining in the primary channel $O^1$. This third consists of every third pair. The warp-carriers which have been used are run into the channel O, and the ring F, which carries the vertical partitions $a$, is raised preparatory to the transferring operation. This ring is raised and lowered by means of the horizontal shaft $S^2$ and its connections, said shaft being turned by means of a crank outside of the frame, as seen on the left-hand side in Fig. 1. A bevel-gear wheel, $X^2$, fixed on this shaft within its outer bearing, engages a bevel-gear, $W'$, on the top of an upright shaft, $S^1$, whose bottom is stepped in the arm which connects ring G to one of the standards B. This shaft has a screw-thread cut upon it from its bottom for about two-thirds the way to its top, that part thereof which is threaded going through tapped holes in the arms, which, on that side of the machine, extend from the ring F to the adjacent standard B. It also goes through the arms that extend from ring H, but without touching, the holes therein being made larger than the screws. There are four such shafts $S^1$ working through the four arms of said rings F H, the one that is seen on the left-hand side of Fig. 1 being the one which receives motion directly from the horizontal shaft $S^2$. The others are driven from it by means of its pinion $U^1$, which engages the teeth of a ring, $V^2$, resting on the arms of the top plate, C, which ring engages pinions $U^1$ on the upper ends of the three other screw-shafts $S^1$. By this means the four screw-shafts $S^1$ are turned at the same time and rate of speed. The ends of the arms through which said screws work are not fastened to the standards, but each is fitted to a vertical guide formed on the inside of standards B, along which they move, carrying the ring F up or down, according to the direction in which the screws are turned. The same shaft $S^2$ also raises and lowers the partitions $a^3$, Fig. 2. Said shaft extends to the center of the machine, and has a bearing in the sleeve $K^1$. The shaft has also near its inner end another bevel-pinion, $X^3$, which gives motion to a much larger horizontal pinion, $U^2$, having a thread cut upon the inside thereof, by which the sleeve J is raised and lowered, carrying with it the plate I and the upper series of partitions, $a^3$. The same shaft $S^2$ therefore which raises the ring F with its partitions $a$ lowers the upper series of partitions, $a^3$, the diameter of the bottom of the last-named series being so much less than the diameter of the top of the adjacent series $a^2$ as to be free to drop down through the same in order to bring the bottoms of the partitions of said series $a^3$ into such a position as to become connected with the bridge by resting on its top, as hereinafter explained.

The crank which turns shaft $S^2$ is loose thereon, but has clutch-teeth on each end of the collar, which connect it to the shaft. When the crank is pushed outward its teeth engage a station-clutch, $c^1$, on the end of the shaft and turn the shaft, thereby giving motion to the central pinion, $U^2$, and consequently to plate I and its attached partitions $a^3$; but by pushing the crank inward it engages the teeth cut on the end of the hub of bevel-gear $X^1$, which hub projects through the bearing of the shaft, (see Fig. 4,) and thereby gives motion to the elevating-screws $S^1$.

The transferring-bridge, a detailed view of a section of which is seen in Figs. 9 and 10, is a detachable device, which, when employed in the loom, extends from the upper ends of partitions $a$ to the lower ends of partitions $a^3$, when the ring F is raised and the plate I is lowered, as above explained. The bridge is made of thin strips of the same thickness as the partitions $a$ $a^3$, bound together at their upper sides by means of thin pieces $e^4$ of sheet metal inserted in the center of the thickness of each strip at two or more different places in their length. These pieces $e^4$ are high enough to permit the stem of the shuttle-carriers to pass underneath cross-bars $c^5$, which connect them together by being placed in slots cut in opposite edges of the projecting pieces $e^4$, the cross-bars being afterward clamped to each other by bands that go around them at their ends, as shown in Fig. 10. The number of strips that compose the bridge is such as to be equal to about one-twelfth of the circumference of the loom, more or less. The lower edge of the bridge is placed on the tops of partitions $a$, inside of the shuttle-carriage band P, the upper end resting against the lower end of the upper partitions, $a^3$, so that the ends of the strips of the bridge will coincide with the partitions $a$ $a^3$, to prevent the warp-carriers from being obstructed on passing on and off the bridge. The bridge having been put in position, the warp-carriers are pushed over it by a curved stick, or any other convenient device, and so passed up to the partitions $a^3$, the strain on the warp-threads being sufficient to hold the carriers at any point on the bridge, since the curve of each strip is drawn from the nearest edge of the crown-plate $m$ as a center. In pushing up the carriers the pushing instrument is placed below their inner stems or lugs, or below their lower ends, as most convenient, and after throwing up one bridgeful the bridge is shifted along, the shuttle-carriage being also moved along an equal distance, when another lot of warp-carriers is raised, until all are up. If the carriers were raised directly from the band $P^1$ their stems as they passed up would strike against the band P. Therefore it becomes necessary to remove it out of the way, and provide a clear path for the warp-carriers. This we accomplish by cutting away a part of the band P between two adjacent standards, $m^1$, and by putting in place of the part cut away a small gate, $P^4$, Fig. 11, hinged low down at each end on pins $r^3$, so as to permit the bar of the gate to swing outward and downward; but when the bar is up it forms a continuation of the band P. When it is down the necessary opening is left for the upward passage of the warp-carriers. The place of the gate is brought opposite where the transfer bridge is used. The upper band, $P^3$, is also cut away at the same place, and the part cut away is placed farther out. After the warp-carriers are all up the bridge is removed, and the weaving of the side crown commences.

The ring I, with its pins, is sometimes run very low, even below the proper bridging position, carrying with it the sleeve J and central plunger, L. The latter needs to be often adjusted independent of the sleeve J, and in order to accomplish this a screw-thread of a proper length is cut on the greater part of the plunger, and a recess is cut through one side of the sleeve J, through which a pinion, $F^2$, projects, so that its teeth engage the thread cut on the plunger. The pinion $F^2$ is supported on a bracket, $G^2$, attached to plate I, and the upper part of this bracket supports a worm, $H^2$, that is turned by the crank $F^3$. By the turning of this crank the plunger L can be raised and lowered, as required, to bring the crown-plate $m$ to any position desired.

The ring H in its weaving position is stationary, and rests on supports placed on the inside of the standards at a proper height; but it is capable of being raised a few inches along the guides, to which the ends of its arms are fitted by placing studs $G^4$ on the top of ring F, beneath each arm of the ring H, so that when ring F is raised to a suitable height the studs will come in contact with the arms of ring H and raise it. This is only necessary to be done for the purpose of getting a little more working room.

The ring V is secured to the upper shuttle-carriage at various places by brackets $m^1$, and gives motion to it. It has also a blade and separating-wheels. The blade is operated by means of toothed plates $j^5$, Fig. 4, which are held adjustably by set-screws on the top of ring V, their toothed edges projecting inward over the upper shuttle-carriage, so as to come in contact with a cog-wheel formed on the screw $q^4$, whose rotation is effected thereby. The blade is connected to a nut on said screw, and is moved by means of the travel of the nut.

When the warp-carriers are passed up on the bridge they are forced as high on the partitions $a^3$ as possible, the tension of the warp being relied on to keep them there. The bridge is then removed, and the plate I and its partitions $a^3$ are raised to the proper height and position for weaving. When the plate I is lowered to a working position the stems of the warp-carriers will be found in the channel $g^4$ above the shuttle-carriage, and will remain there, when the carriage is rotated, so long as the switch $h^4$ is down in the position given to it in Fig. 4; but when that switch is raised by means of its handle $h^4$, they will pass down the channel $i^4$ to the separating-wheels $j^4$ $k^4$, which will divide them right and left interchangeably, one-half passing down the passage $m^4$, and the other half into the continuation of the channel $i^4$. Those which pass down the channel $m^4$ are delivered by the continued rotation of the carriage into the lower channel, $g^5$, whence they are returned to the forward end of channel $m^4$ by means of switch $h^5$, which is operated through a handle, $h^5$. This switch, being turned down across the channel $g^5$ during the rotation of the carriage, diverts the warp-carriers that are found therein into the said channel $m^4$, to be again passed through the separating-wheels. These wheels, unlike those of the lower shuttle-carriage, are rotated entirely from contact with the outer stems of the warp-carriers, and since the forward portions of the channels $m^4$ $i^4$ are always full, while this part of the weaving operation is going on the wheels do not require any other device to rotate them. When the side crown is finished it is necessary again to shut the switch $h^4$ and close the channel $i^4$, when all the warp-carriers will soon be brought into channel $g^4$, ready to be transferred to the lower part of the loom.

The blade of the upper shuttle-carriage must always be removed, and also the brace which supports it, each time the plate I is run up or down, in order to allow the series of partitions $a^2$ $a^3$ to pass each other. In all cases when removed, the collar that connects the blade with the screw $q^4$ is near the top of the screw, and the top piece of the blade $J^4$ is above the partitions $a^3$, and consequently no harm takes place. The lower end of this blade is shaped as shown in Fig. 1, the gathering-ring $n^4$ being attached to it at its lower back corner, and its front corner being turned upward, so as to form a shoe which will help to separate the warp-threads as they pass off the point of the gathering-ring.

The brace $K^4$, which supports the blade $J^4$ and keeps it in proper position, is secured at its upper ends to the upper shuttle-carriage by means of cross-bars $L^4$. The lower part of the brace is so formed as to straddle the blade and give it plenty of room to swing in as it goes up and down the side crown of the hat.

The thread or filling coming from a spool placed on any convenient part of the shuttle-carriage passes down behind the blade $J^4$ to a small groove formed on the circumference of ring $n^4$, which receives it and conducts it to the point of the ring, and delivers it on the under side of the point, where the groove terminates. After the side crown is woven and the warp-carriers are run up into channel $q^4$, the blade $J^4$, with its ring $n^4$ and the brace $K^4$, are removed, and the ring F and plate I are put into proper position for going through the bridging, operation when the bridge is replaced, and the warp-carriers are ready to be retransferred to the lower part of the loom. The brim-collar or frame $C^1$, over which the brim-strands are to be bent, is raised from below by raising the plunger N, in the manner heretofore described, until its upper edge is as high as the top of the side crown, and it is kept there until all the warp-carriers have been brought down between the lower series of partitions, $a$. When the side crown is to be woven it becomes necessary to let out the strands of warp, in consequence of the distance to which the warp-carriers $n$ have been moved from the line of weaving. We accomplish this by a peculiar mode of connecting the strands of the warp to the warp-carriers $n$. This connection is shown in Figs. 7 and 8. It consists in interposing a cord, $b^5$, and a hook and link between the outer ends of the warp-strands and the rubber spring $a^5$, the cord being arranged in the form of a double loop, one end of which is slipped over a small hook made at that end of the link that is nearest the rubber spring, while the middle of the loop passes through an eye in the other end of the link, so that the cord can be run through the eye at a full length, or be drawn back and hooked fast near to the rubber spring. By means of this construction the warp can be let out a distance equal to the length of the link, from either of whose ends the loop can be extended at pleasure. The loop is seen fully extended in Fig. 7, and shortened up in Fig. 8. The extension thereof is made just after the warp-carriers are pushed up over the bridge, after being transferred to the upper part of the loom.

The bridge is removed when the warp-carriers have been retransferred, and the plunger L is screwed down until its crown-plate $m$ rests on the bottom of the frame $C^1$, the pressure of the plate forcing down the lower plunger, N, until the upper edge of frame $C^1$ is on a level with the weaving-line. The ring F is now run down, the sections or parts of the lower shuttle-carriage are arranged for operation, and the weaving of the brim is commenced, the strands of the additional one-third warp hitherto kept in reserve being thrown in at intervals by bringing their warp-carriers within the range of the tongue $n^1$ of the lower shuttle-carriage. In order to procure room for the free passage of the frame $C^1$ up and down, the inner ends of the warp are secured to small wire rings, that are held to their connections by the strain of the warp.

When the brim has reached the required size it is taken out of the loom by unhooking all the warp-strands from their carriers, and the edge of the brim is finished by hand.

The modification shown in Fig. 12 of the indicator apparatus, for pushing the warp-carriers up out of primary channel $O^1$ into the shuttle-carriage, is constructed and operated upon the same principle as that above described, although differing in form and position. In this example it is placed within a wide ring or band, R, which is suspended from the under side of the shuttle-carriage ring D, which is rotated from gear-wheels. (Shown between it and the standard B of the loom.)

The stationary supporting-ring E of the lower weaving mechanism is made of a different shape from that given to it in Fig. 2, in order to adapt it to this modification in the position and form of the indicator apparatus. Next below ring E is placed a ring, E', the inner part of which is projected downward a little, and has cog-teeth A formed thereon, whose number is even, and exceeds by one the number of partitions of the loom. The number of teeth, furthermore, is to be a multiple of the number of teeth formed on the circumference of a hubless wheel, $B^2$, hereinafter described, which engages the teeth on the fixed ring E'.

From the inner faces of partitions $a$ extend vertical rods $r$, whose number is one-half the number of the partitions, which rods extend downward into a groove made in the periphery of said wheel $B^2$, but without touching it. These rods extend through the rings E E' and are suspended on them, so as not to fall too low, their upper ends being a little below the inner ends of the warp-carriers $n$, or else a little below their inner lugs, where they are in readiness to lift the warp-carriers out of primary channel $O^1$, when they themselves are lifted, as hereinafter described.

The letter P designates the indicator-cylinder, which is here suspended within ring R in a horizontal position. Through the center of cylinder P is extended a screw-shaft, $P^8$, whose left-hand end has its bearing in the end plate H of the cylinder, while its right-hand end goes centrally through cog-wheels $B^2$ $C^2$ $D^2$, passing through the hubs of the wheels $C^2$ $D^2$, whose axis it becomes. These wheels run independently of each other, although they are all turned by engaging with the same teeth A. The wheel $B^2$, which is the widest of the three, has a grooved periphery, and the left-hand portion of its periphery extends within the right-hand end of cylinder P, while its right-hand part has teeth formed thereon, which engage with the teeth A, aforesaid.

The wheel $C^2$ has on each side a flange which fits loosely in a groove in the adjacent sides of the wheels $B^2$ $D^2$, and by this means together with the support it receives in the end of the cylinder, the wheel $B^2$ is supported and kept in place. The teeth A are of such a length as to engage all three of the wheels $B^2$ $C^2$ $D^2$ at the same time, and said wheels are consequently rotated when the cylinder P is carried round with the ring $D^1$ of the loom. The said wheels have not an equal number of teeth; but supposing the wheel $B^2$ to have ninety-six, the next wheel $C^2$ must have ninety-five, and $D^2$ ninety-four, the teeth A numbering nine hundred and sixty, which number is a multiple of the number of teeth of wheel $B^2$.

The wheels $C^2$ $D^2$ are loose on the shaft $P^8$, whose screw-thread is cut only on that part which is between its bearings. The right-hand end of said shaft has a spring-arm, O, fixed on it, which extends radially toward the rim of wheel $D^2$ and carries a pin that catches in a recess near the rim of that wheel, and consequently connects the shaft and wheel so that they turn together, except when the arm is disengaged from said wheel. The hub of wheel $C^2$ has an arm placed loosely on it, which carries a rod $a^1$ that extends toward the end H of the cylinder at a little distance from the screw-shaft, its left end being supported in the end of an arm which is placed loosely on the smooth part of said shaft.

The shaft $P^8$ has a nut, F, thereon, which has an arm that reaches nearly to the side of the cylinder P, in order that it may come against the lugs C of rods $h$, which reach through the end H of cylinder P and through the left rim of wheel $B^2$.

The outer ends of rods $h$ have also lugs $h$, which are severally free to enter slots cut through the end H, whenever the arm of the nut F has turned its rod by coming against its lug C; at which time a spring, $d$, is allowed to draw such rod $h$ inward to the position shown in the lower side of cylinder P, its inner end, when the cylinder in its revolution brings it round, being in a position to lift one of the rods $r$, and so raise one or more of the warp-carriers.

It will be observed that cylinder P, with its rods $h$, which are arranged in suitable numbers near its inner surface, there being in this example forty-eight, being half the number of teeth in wheel $B^2$, is rotated with the wheel $B^2$, which, having an even number of teeth, will revolve an equal number of times to each revolution around the machine, always coming round to the same place; but the wheel $C^2$, having only ninety-five teeth, is slower by one tooth than the wheel $B^2$, and, consequently, operates the nut F and its tapping-arm through the arm or rod $a^1$, in one complete revolution of the indicator, the wheel $C^2$ running behind ten teeth.

The screw-shaft $P^8$ is connected to the wheel $D^2$, which has only ninety-four teeth, and the arm $a^1$ of wheel $C^2$ which runs through the arm of the nut F, causes it to move slowly inward on the screw-shaft, bringing the end of the nut against the lugs C, so as to turn the rods partially around and allow the springs $d$ to move them inward in the path of the rods $r$. The lugs C are arranged at different heights on their rods.

When the nut F has reached the bottom of the shaft, the spring-arm O is released from wheel $D^2$, and the screw $P^8$ can then be turned the other way by a crank, $m$, so as to run the nut up to the outer end, the rods $h$ being pushed back to their normal position by hand, or in any other convenient way.

The indicator apparatus can be applied to either set of weaving mechanism, as when a loom is made with only one set, or when only one set in a loom having two is operated.

We do not wish to confine ourselves to the precise form of the parts herein represented in carrying out our invention, since the invention can be carried out under modified forms without departing from the principle of construction and operation here set forth.

We claim as new and desire to secure by Letters Patent—

1. In a circular loom having one or more sets of weaving machinery, elevating and depressing the upper series of partitions, $a^3$, and their attachments, substantially as above described.

2. Elevating and depressing the ring H, carrying the series of partitions $a^2$, and the ring F, carrying the partitions $a^1$, by means of the screws $S^1$ or their equivalents, substantially as described.

3. The use of fixed rack U or its equivalent, by which an independent motion is given to the separating-wheels $q\ q^1$ of the shuttle-carriage, substantially as above described.

4. The primary channel $O^1$ beneath the shuttle-carriage, which receives and retains the stems of the warp-carriers $n$, until removed by the indicator-rods $r$, substantially as described.

5. Raising the warp-carriers from the primary channel $O^1$ into the path of the shuttle-carriage by means of an indicating apparatus made substantially as described.

6. Transferring the warp-carriers from the lower part of the loom to the upper part, and vice versa, by means of the bridge shown in Figs. 9 and 10, or any equivalent device, substantially as described.

The above specification of our invention signed by us this 2d day of March, 1866.

PHINEAS L. SLAYTON.
    CHAS. I. KANE.

Witnesses:
 M. M. LIVINGSTON,
 ALEX. F. ROBERTS.